US012180384B2

United States Patent
Dawidowski et al.

(10) Patent No.: US 12,180,384 B2
(45) Date of Patent: Dec. 31, 2024

(54) SINGLE LAYER AUTODEPOSITABLE COATING FORMULATION

(71) Applicant: Henkel AG & Co. KGaA, Duesseldorf (DE)

(72) Inventors: Ulrich Dawidowski, Wildberg (DE); Nicole Auweiler, Dormagen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 280 days.

(21) Appl. No.: 17/571,140

(22) Filed: Jan. 7, 2022

(65) Prior Publication Data

US 2022/0127490 A1 Apr. 28, 2022

Related U.S. Application Data

(63) Continuation of application No. PCT/EP2020/068190, filed on Jun. 29, 2020.

(30) Foreign Application Priority Data

Jul. 12, 2019 (DE) .................. 102019119006.1

(51) Int. Cl.
| | | |
|---|---|---|
| C09D 153/00 | (2006.01) | |
| B05D 7/14 | (2006.01) | |
| C08F 293/00 | (2006.01) | |
| C08K 3/16 | (2006.01) | |
| C09D 4/00 | (2006.01) | |
| C09D 7/61 | (2018.01) | |

(52) U.S. Cl.
CPC .......... C09D 153/00 (2013.01); B05D 7/142 (2013.01); C08F 293/005 (2013.01); C08K 3/16 (2013.01); C09D 4/00 (2013.01); C09D 7/61 (2018.01); *C08F 2438/01* (2013.01); *C08F 2438/02* (2013.01); *C08F 2438/03* (2013.01)

(58) Field of Classification Search
None
See application file for complete search history.

(56) References Cited

U.S. PATENT DOCUMENTS

| | | |
|---|---|---|
| 4,636,265 A | 1/1987 | Fischer et al. |
| 4,647,480 A | 3/1987 | Ahmed |
| 5,011,715 A | 4/1991 | Broadbent |
| 5,061,523 A | 10/1991 | Shachat |
| 5,248,525 A | 9/1993 | Siebert |
| 5,300,323 A | 4/1994 | Ahmed |
| 5,385,758 A | 1/1995 | Ahmed |
| 5,409,737 A | 4/1995 | Ahmed et al. |
| 5,646,211 A | 7/1997 | Honda et al. |
| 5,705,075 A | 1/1998 | Kozak et al. |
| 5,786,030 A | 7/1998 | Ahmed et al. |
| 5,945,170 A | 8/1999 | Ahmed et al. |
| 6,033,492 A | 3/2000 | Hatano et al. |
| 6,096,806 A | 8/2000 | Mueller et al. |
| 6,410,092 B1 | 6/2002 | Fristad et al. |
| 6,559,204 B1 | 5/2003 | Agarwal |
| 6,723,765 B2 | 4/2004 | Bammel |
| 6,833,398 B2 | 12/2004 | Agarwal et al. |
| 6,989,411 B2 | 1/2006 | Bammel et al. |
| 8,518,493 B2 | 8/2013 | Abu-Shanab et al. |
| 8,663,376 B2 | 3/2014 | Nakayama et al. |
| 8,871,309 B2 | 10/2014 | Abu-Shanab et al. |
| 9,228,109 B2 | 1/2016 | Qiu et al. |
| 9,718,092 B2 | 8/2017 | Abu-Shanab et al. |
| 9,895,717 B2 | 2/2018 | Abu-Shanab et al. |
| 9,951,169 B2 | 4/2018 | Yang et al. |
| 11,426,762 B2 | 8/2022 | Du et al. |
| 2003/0082391 A1 | 5/2003 | Goodreau et al. |
| 2005/0065242 A1* | 3/2005 | McGee ............. C08G 18/0823 523/402 |
| 2006/0047085 A1* | 3/2006 | Trivedi ................ C08G 18/792 525/329.7 |
| 2006/0057363 A1* | 3/2006 | Takahashi .............. B05D 5/068 428/323 |
| 2008/0160199 A1 | 7/2008 | Nadupparambil Sekharan et al. |
| 2009/0236288 A1 | 9/2009 | Kozak et al. |
| 2010/0112362 A1* | 5/2010 | Craciun ................. C09J 143/02 526/278 |
| 2011/0311827 A1* | 12/2011 | Droniou .................... C09D 7/62 428/418 |
| 2012/0156386 A1 | 6/2012 | Schmidt-Freytag et al. |

(Continued)

FOREIGN PATENT DOCUMENTS

| | | |
|---|---|---|
| CA | 1280844 C | 2/1991 |
| CN | 103189149 A | 7/2013 |
| EP | 2655531 B1 | 6/2017 |

(Continued)

OTHER PUBLICATIONS

Yang—Phosphate-Polymerizable-Adhesion-Promoters—PAM-200 structure—2005 (Year: 2005).*
Wan Bin, et al, "Synthesis of epoxy-acrylate emulsion for autodeposition coating", Thermosetting Resin, vol. 30, No. 2, Mar. 2015, pp. 27-30. Copyright 1994-2021 China Academic Journal Electronic Publishing House. Cited in counterpart CN application.
International Search Report for PCT/EP2020/068190 mailed Oct. 15, 2020.
DE Search Report for DE 102019119006.1 dated Jan. 2, 2020.
Technical Data Sheet, ADDAPT PolySurF HP (Radiation) Curing Additive, Publication No. PO86104, Copyright ADDAPT Chemicals BV 2003, Version 4: 2016, 2 pages.

(Continued)

*Primary Examiner* — John Vincent Lawler
(74) *Attorney, Agent, or Firm* — Mary K. Cameron

(57) ABSTRACT

The present invention relates to an aqueous autodeposition composition comprising iron(II) ions, fluoride ions, at least one chain transfer agent and at least one dispersed organic binder component, wherein the organic binder component comprises at least one water-dispersible polymerizable (meth)acrylic acid component; and at least one acrylated mono- or diphosphate ester component.

14 Claims, No Drawings

(56) References Cited

U.S. PATENT DOCUMENTS

| | | | |
|---|---|---|---|
| 2014/0234641 A1* | 8/2014 | Kumar | C23C 2/26 427/327 |
| 2014/0262791 A1 | 9/2014 | Sekharan et al. | |

FOREIGN PATENT DOCUMENTS

| | | | |
|---|---|---|---|
| JP | H05214265 A | 8/1993 | |
| TW | 323239 B | 12/1997 | |
| WO | 9106379 A1 | 5/1991 | |
| WO | 9315154 A1 | 8/1993 | |
| WO | 9316813 A1 | 9/1993 | |
| WO | 9406861 A1 | 3/1994 | |
| WO | 9633815 A1 | 10/1996 | |
| WO | 9637554 A1 | 11/1996 | |
| WO | 9709127 A1 | 3/1997 | |
| WO | 9711786 A1 | 4/1997 | |
| WO | 9730794 A1 | 8/1997 | |
| WO | 2009074610 A | 6/2009 | |
| WO | 2009088993 A2 | 9/2009 | |
| WO | WO-2012087813 A2 * | 6/2012 | C08L 63/00 |
| WO | 2017117169 A1 | 7/2017 | |
| WO | 2021146169 A1 | 7/2021 | |

OTHER PUBLICATIONS

G.Moad, in Polymer Science: A Comprehensive Reference, 1st Edition, Jun. 2, 2012, eBook ISBN: 9780080878621, Published by Elsevier, Abstract only.

* cited by examiner

SINGLE LAYER AUTODEPOSITABLE COATING FORMULATION

The present invention relates to an aqueous autodeposition composition comprising iron(III) ions, fluoride ions, at least one chain transfer agent and at least one dispersed organic binder component, wherein the organic binder component comprises at least one water-dispersible polymerizable (meth)acrylic acid component; and at least one acrylated mono- or diphosphate ester component.

Self-precipitating compositions, also referred to as autophoretic baths in the field, are used for organic coating of metallic surfaces, usually iron surfaces, as a corrosion-preventing primer coating of metallic components or as an adhesive intermediate layer in the production of metal-elastomer compounds, for example, the vibration-damping components in the automotive industry. Autophoretic coating is a dip coating method, which is performed without an external electric current, i.e. without applying an external voltage source, in contrast to electrodip coating. Such self-precipitating compositions are usually aqueous dispersions of organic resins or polymers, which coagulate directly on the surface of the component in a thin liquid layer upon contact with the metallic surface due to the pickling removal of metal cations. Since the coverage of the metallic surface with the coagulated resin particles and/or polymer particles leads to a decline in metal dissolution, the coagulation process is delayed and ultimately terminated, for which reason layer formation is of a self-limiting nature.

The technical implementation of the autophoretic deposition requires constant monitoring of the bath composition. First, the deposition bath must be adjusted so that self-precipitation occurs rapidly and homogeneously enough upon contact with the metallic surface. Accordingly, stability of the dispersion within the dip bath must be permanently ensured. In addition, the concentration of the cations absorbed from the dip bath during the deposition process must not be allowed to rise above a bath-specific threshold level because otherwise the aqueous dispersion as a whole becomes unstable and coagulates.

The layer directly deposited from the autophoretic bath has a gelatinous consistency, and thermal treatment thereof induces final polymerization of the organic binder components, which may be further promoted by curing agents. Thus obtained polymeric coatings protect the metallic surface against corrosion and can withstand mechanical stresses.

As the organic binder component, generally, one-component systems and two-component systems may be employed, wherein various types of organic polymerizable monomeric, oligomeric and polymeric compounds may be used, depending on the intended application and desired mechanical, physical and optical properties and characteristics of the metal substrate. Economically, one-component systems are preferable due to generally less complex formulations. Acrylic polymers are an example of organic one-component binder components. Acrylic based coatings are stable against ultraviolet radiation, but not sufficiently corrosion-resistant. Comparably lower glass transition temperatures of respective cured coatings generally go hand in hand with good deformation characteristics, yet lead to insufficient block resistance. Furthermore, hydrofluoric acid-containing autodeposition compositions including acrylic binder components suffer from diminished stability and yield only a limited variety of color.

U.S. Patent Application Publication 2006/0047085 A1 discloses metal coating compositions containing an acrylic polyol synthesized with a phosphated monomer having improved adhesion and corrosion resistance characteristics. The described phosphated monomers may be incorporated into finished coating compositions by any suitable manner. However, preferably, a film-funning polymer, for example an acrylic polyol, is synthesized with the phosphated monomer in a heated reactor. Other suitable film-forming polymers include acrylic polymers, polyurethane polymers, polyesters, alkyds, polyamides, epoxy group containing polymers, and the like. Its use in two-component systems is especially preferred. The disclosed compositions are intended for spray-on applications.

Accordingly, there is a need in the art for economically advantageous, stable autodeposition compositions, which yield malleable yet adherent, weatherproof, in particular corrosion-resistant coatings that furthermore come in a variety of colors and have good block resistance.

Surprisingly, it has been found that the incorporation of certain acrylated mono- and diphosphate esters into the acrylic polymer-based binder portion of an aqueous autodeposition composition overcomes the above-stated technical shortcomings associated with acrylic polymer-based autodeposition compositions for the coating of metal surfaces and furthermore yields coatings featuring prominent and permanent gloss.

In a first aspect, the present invention thus relates to an aqueous autodeposition composition comprising:
water;
fluoride ions;
iron(III) ions;
at least one chain transfer agent; and
at least one organic binder component dispersed in the aqueous phase,
wherein the organic binder component comprises at least one water-dispersible, polymerizable (meth)acrylic acid compound; and at least one acrylated mono- or diphosphate ester compound or a salt thereof, having the formula (I):

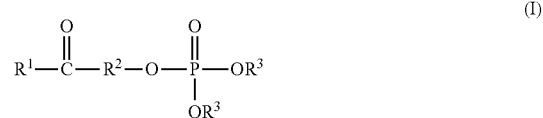

wherein, in formula (I),
$R^1$ represents an optionally substituted vinyl group;
$R^2$ represents a divalent hydrophobic group; and
each $R^3$ is independently selected from the group consisting of H and a group having the formula (II):

wherein, in formula (II), $R^1$ and $R^2$ are as defined above for formula (I).

In a second aspect, the present invention further relates to the use of an aqueous autodeposition composition according as described herein for the autophoretic coating of metal surfaces.

In another aspect, the present invention relates to a method for the autophoretic coating of a metal surface, wherein, at least in one step, the metal surface is contacted with a composition as described herein.

In yet another aspect, the present invention also relates to metallic substrate coated by a method as described herein.

Various embodiments of the present invention are described below, but the present invention is not limited thereto. It should be recognized that these embodiments are merely illustrative of the principles of the present invention. Numerous modifications and adaptations will be readily apparent to those of skill in the art without departing from the scope of the invention.

"One or more", as used herein, relates to at least one and comprises 1, 2, 3, 4, 5, 6, 7, 8, 9 or more of the referenced species. Similarly, "at least one" means one or more, i.e. 1, 2, 3, 4, 5, 6, 7, 8, 9 or more. "At least one", as used herein in relation to any component, refers to the number of chemically different molecules, i.e. to the number of different types of the referenced species, but not to the total number of molecules.

In the present specification, the terms "a" and "an" and "at least one" are the same as the term "one or more" and can be employed interchangeably.

"About", as used herein in relation to a numerical value, means said value ±10%, preferably ±5%.

All percentages given herein in relation to the compositions or formulations relate to weight % relative to the total weight of the respective composition or formula, if not explicitly stated otherwise.

"Autodeposition composition" or "self-precipitating composition", as used herein interchangeably, is understood to refer to a composition, which, upon contact with a metallic surface, induces coagulation of its organic ingredients such that an organic-inorganic layer may be formed on the metallic surface. Suitable surfaces may be selected from iron, zinc and aluminum surfaces as well as alloys thereof, such as steel surfaces. In order to initiate destabilization of the particulate aqueous composition and thus coagulation of the colloidally dissolved and/or dispersed composition components in the form of a homogeneous film on the metallic surface, a sufficiently high solution pressure for metal cations of the metallic surface to be coated is required. Thermal curing of a thus formed film yields an organic-inorganic hybrid coating, which protects the metallic surface against corrosion.

The aqueous autodeposition composition of the present invention comprises:
 fluoride ions;
 iron(III) ions;
 at least one chain transfer agent;
 at least one organic binder component dispersed in the aqueous phase; and
 water.

The amount of fluoride ions of the composition according to the invention is understood to refer to the total quantity of free fluoride ions and those bound in complex form in water-soluble compounds. The fluoride portion determines the pickling rate of the autodeposition composition for the respective metallic surface and further masks metal cations such that coagulation of the particulate ingredients of the composition is prevented even at an elevated metal ion content, thus increasing overall autodeposition bath lifetime. To increase the pickling rate on the metallic surface and to accelerate coagulation in immediate proximity to the metallic surface, a molar ratio of fluoride ions to iron(III) ions of at least 2:1 in the autodeposition composition of the present invention is preferred. According to certain embodiments, the molar ratio of fluoride ions to iron(III) ions is at least 3:1.

However, the molar ratio of fluoride ions to iron(III) ions in the composition according to the invention should preferably not exceed 6:1, and especially should not exceed 4:1, since otherwise the metallic surface may be corroded, the result of which would be excessive surface roughness.

The total portion of iron(III) ions contained in the composition according to the invention is preferably at least 0.02 wt.-%, but preferably no more than 0.3 wt.-%, especially preferably no more than 0.2 wt.-%, based on the element iron. If the preferred minimum quantity of iron(III) ions is significantly below these values, the oxidation potential of the composition according to the invention is very low, resulting in delayed precipitation kinetics for the particulate ingredients. The change in and/or inhibition of self-precipitation may also cause the development of nonhomogeneous coatings. Excessively high concentrations of iron(III) ions may result in severe attack on the metallic surfaces to be treated, thus causing excessive surface roughness. Furthermore, such compositions tend to be susceptible to precipitation of iron(III) salts and coagulation of particle portions even at relatively low ratios of masking fluoride ions.

To maintain or further increase the oxidation potential, the aqueous composition may additionally contain an oxidizing agent, preferably hydrogen peroxide. The addition of oxidizing agents, such as hydrogen peroxide, may be particularly important in the treatment of iron-containing surfaces for the conversion from iron (II) to iron (III) ions, since iron (II) ions cause a greater reduction in the stability of the dispersed particulate ingredients in fluoride-containing compositions than the corresponding iron(III) ions.

The organic binder component of the aqueous autodeposition composition of the present invention comprises, as a first component thereof, at least one water-dispersible, polymerizable component. According to the present invention, said water-dispersible, polymerizable component is in the form of a (meth)acrylic acid polymerizate, in other words, may be selected from the group consisting of (meth)acrylic acid (ester) oligomers and (meth)acrylic acid (ester) polymeric compounds.

As a second component, the organic binder component of the aqueous autodeposition composition according to the present invention comprises at least one acrylated mono- or diphosphate ester component, or a salt thereof, having the formula (I):

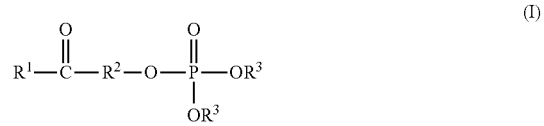

wherein, in formula (I), $R^1$ represents an optionally substituted vinyl group; $R^2$ represents a divalent hydrophobic group; and each $R^3$ is independently selected from the group consisting of H and a group having the formula (II):

wherein, in formula (II), $R^1$ and $R^2$ are as defined above for formula (I).

In formula (II), the ⸹ indicates the attachment point to the oxygen atom coupled to the P atom.

In some embodiments, in formula (I), at least one R3 is H.

In some embodiments, $R^1$ is selected from the group consisting of $CH_2$=CH, $CH_2$=C($CH_3$)— and CH(COOH)=CH—. In specific embodiments, $R^1$ is selected from the group consisting of $CH_2$=CH— and $CH_2$=C($CH_3$)—.

In certain embodiments of the invention, the organic binder component comprises at least one acrylated diphosphate ester component, or a salt thereof, according to formula (I), with $R^3$ being a group of formula (II), wherein $R^1$ in formula (I) is identical to $R^1$ in formula (II), and $R^2$ in formula (I) is identical to $R^2$ in formula (II).

In various embodiments, in the above formula (I), the divalent hydrophobic group is selected from:

1) a polyoxyalkylene radical having the formula (III):

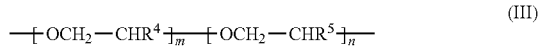
(III)

wherein, in formula (III), $R^4$ and $R^5$ are independently selected from the group consisting of H and methyl; and m and n independently represent an integer from 0 to 60, wherein 1≤m+n≤60; and 2) a linear alkoxy radical having the formula (IV):

(IV)

wherein, in formula (IV), $R^6$ is a linear C2-C10 alkylene radical.

According to certain embodiments, in the above formula (III), m and n independently represent an integer from 0 to 50, wherein 1≤m+n≤50. In some embodiments, in the above formula (III), the molar ratio of oxypropylene units to oxyethylene units is at least 3:1. In some other embodiments, the molar ratio of oxypropylene units to oxyethylene units is at least 4.1. In yet another embodiment, the molar ratio of oxypropylene units to oxyethylene units is at least 5:1.

According to other embodiments, in the above formula (IV), $R^6$ is a linear alkylene radical having no more than 8 carbon atoms, in other words, $R^6$, in the above formula (IV), preferably denotes a linear C2-C8 alkylene radical.

The organic binder component of the aqueous autodeposition composition of the present invention comprises the at least one water-dispersible, polymerizable component, as defined above, and the at least one acrylated mono- or diphosphate ester component, as defined above, in copolymerized form. In other words, the at least one acrylated mono- or diphosphate ester component is copolymerized into/undergoes radical crosslinking with the other polymerizable components, i.e. the at least one water-dispersible, polymerizable component, of the organic binder component to form water-dispersible polymerizate particulates.

The underlying invention especially addresses the loss of prominent and permanent gloss oftentimes observed in autodeposition baths that are based on acrylic dispersion as a binder material. Consequently, in a more preferred embodiment of this invention the organic binder does not comprise a significant amount of epoxy resins and therefore the epoxy weight equivalent (EEW) being the weight of dispersed particulates portion of the autodeposition composition of this invention in grams which contains one gram-equivalent of epoxy is preferably less than 1, more preferably less than 0.1, even more preferably less than 0.01. In order to determine the epoxy weight equivalent, 100 g of tetraethylammonium bromide needs to be dissolved in 400 mL glacial acetic acid. Approx. 1 g of the dispersed particulate portion of the dispersion is to be dissolved in 10 mL methylene chloride in a 150 mL flask. 10 mL of the above tetraethylammonium bromide solution shall then be added to the flask containing the particulate portion. Seven drops of crystal violet indicator are to be added to the same flask, stirred well and titrated against 0.1 N perchloric acid solution to an end point transition from sharp blue to green. The dispersed particulate portion of the autodeposition composition of this invention is obtained by ultrafiltration of the autodeposition bath at 20° C. with a membrane having a nominal molecular weight cut off of size of 10 kD as the retentate which is thereafter dried to constant mass at 105° C. in a drying furnace.

A further component of the aqueous autodeposition composition according to the present invention is at least one chain transfer agent. Chain transfer agents are known in the art and generally employed in polymerization processes as a means for controlling both molecular weight and polydispersity of the polymer, i.e. the respective polymeric macromolecule. Chain transfer agents suitable for employment in the context of the present invention may for instance be selected from the group consisting of chain transfer agents commonly used in ATRP processes; chain transfer agents commonly used in RAFT processes, such as dithioesters, thiocarbamates, and xanthates; chain transfer agents commonly used in SFRP processes, such as (2,2,6,6-tetramethylpiperidin-1-yl)oxyl; thiols, such as dodecyl mercaptan; secondary alcohols, such as tert-butyl alcohol; and halocarbons, such as carbon tetrachloride. The above listing of chain transfer agents is understood to be exemplary only and not limiting.

The aqueous autodeposition composition of the present invention may further comprise pigments and/or water-soluble colorants.

In the context of the present invention, the term "pigments" refers to water-insoluble particulate components, which fall under DIN 55943 for pigments. In the context of the present invention, pigments whose components have an equilibrium concentration in the aqueous phase at 7 of less than 1 mM, preferably less than 0.1 mM at 20° C., are considered to be water insoluble According to certain embodiments, the aqueous autodeposition composition comprises at least one type of particulate pigment material, as defined herein.

In the context of the present invention, particulate pigment materials are preferred that have a D90 value of no more than 10 μm, preferably no more than 5 μm. A D90 value indicates that 90 vol.-% of the particles of a particulate composition are below the stated particle size. Such values can be determined from volume-weighted cumulative particle size distributions, which can be measured using dynamic light scatter methods.

According to certain embodiments, the grain size of the particulate pigment material is less than 10 μm (i.e. a grindometer value according to DIN EN 21 524), and more than 1 μm.

Pigment materials and soluble colorants suitable for employment in compositions according to the present invention are known in the art and may be selected for instance depending on the desired color of the end product, i.e. the autophoretic coated metal surface. Examples of suitable materials include carbon black, phthalocyanine blue, phthalocyanine green, quinacridone red, hansa yellow, and/or benzidine yellow pigment, and the like.

Pigment materials suitable for employment in compositions according to the present invention may, for instance, be selected from oxides, carbonates, sulfates and phosphates of at least one metallic and/or semi-metallic element and/or from carbon black and metals, preferably metals with a negative electrochemical standard potential. These compounds are preferably selected from the corresponding water insoluble salts of at least one of the metallic or semi-metallic elements silicon, titanium, zirconium, zinc, chromium, manganese, iron, magnesium, calcium and barium.

Examples of colored pigments include black and white pigments selected from carbon black, preferably oxidatively modified carbon black with more than 5 wt.-% oxygen, titanium dioxide, barium sulfate and zinc oxide.

Examples of suitable organic color-imparting pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, and aniline black.

According to certain embodiments, the aqueous autodeposition composition comprises at least one kind of particulate pigment material, as defined above.

According to some embodiments, the particulate pigment material may be employed in the form of water-dispersible pigment-binder particles composed of a pigment portion and a binder portion, as disclosed in US 2011/0311827 A1. According to some embodiments, the binder portion of said pigment-binder particles may contain at least one reactive anionic emulsifier, which may be selected from acrylated mono- or diphosphate ester components according to formula (I) of the present invention.

Overall, the dispersed particle portion of the composition according to the invention preferably amounts to at least 1 wt.-%, particularly at least 3 wt.-%. A content of less than 1 wt.-% of dispersed binder organic binder component, particulate pigment material, optionally in the form of pigment-binder particles, impedes self-precipitation of said particulate constituents upon contact of the autodeposition composition with the metallic surface. The particle portion preferably does not exceed 30 wt.-% for easier handling and application of the autophoretic coating bath.

Additional optional components of the composition according to the present invention include, for instance and without limitation, flow agents such as glycol ethers and alcohol esters, which improve film formation of the coating on the metallic surface, and foam suppressants, preferably those based on non-ionic surfactants.

Another object of the present invention is the use of an aqueous autodeposition composition as herein described for the autophoretic coating of metal surfaces.

The present invention further relates to a method for the autophoretic coating of a metal surface, wherein, in at least one step, the metal surface is contacted with an aqueous autodeposition composition as described herein. In a method according to the invention, the cleaned, degreased metallic surface, i.e., freed of organic impurities, is brought into contact with a composition according to the invention. In the context of the present invention, metallic surfaces selected from iron, zinc and/or aluminum surfaces as well as their respective alloys can be used, such as, for example, steel surfaces. The composition is preferably brought in contact with the metallic surface of the respective component in a dip or spray method, wherein the dip method is especially preferred, since a more homogeneous wetting of the surface may be realized.

In dip methods according to the invention, in which surfaces containing iron are treated, the redox potential may be used as an indicator for the ratio of iron (II) ions to iron(III) ions in the aqueous autodeposition composition and may be regulated by adding hydrogen peroxide, so that the greatest possible bath stability can be ensured. The redox potential is the electrochemical equilibrium potential of a redox system measured on an inert metal electrode, for example, platinum.

In a preferred embodiment, a reactive rinsing is performed after bringing the composition into contact with the metallic surface, with or without a rinsing step in between.

Such a reactive rinsing additionally protects the metallic surface coated by the method according to the invention against corrosion and thus corresponds to a passivating post-treatment of the non-crosslinked coating. The reactive rinsing is performed directly after the treatment of the metal surface with the composition described herein, i.e., with or without a rinsing step in between, but in any case, takes place before the hardening of the coating.

Film formation of the coating may take place either immediately after bringing the composition in contact with the metallic surface, i.e., with or without a rinsing step in between, or the coating is cured only after the reactive rinsing has been performed. Curing temperatures preferably range from at least 90° C. to no more than 250° C.

A metallic substrate coated by a method as described is yet another object of the present invention. In some embodiments of the present invention, the metallic surface may be selected from iron surfaces, zinc surfaces, aluminum surfaces and metal alloy surfaces of one or more of the aforementioned metals. According to some embodiments, the metal surface is a steel surface.

The herein described autodeposition compositions are economically advantageous, stable and yield malleable yet adherent, weatherproof, in particular corrosion-resistant coatings of various colors having good block resistance as well as prominent and permanent gloss.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. The words "comprises/comprising" and the words "having/including" when used herein with reference to the present invention are used to specify the presence of stated features, integers, steps or components but does not preclude the presence or addition of one or more other features, integers, steps, components or groups thereof.

What is claimed is:

1. An aqueous autodeposition composition comprising:
   water;
   fluoride ions;
   iron(III) ions;
   at least one chain transfer agent;
   at least one organic binder component dispersed in the aqueous phase,
wherein the at least one organic binder component comprises at least one water-dispersible, polymerizable (meth) acrylic acid compound; and at least one acrylated phosphate ester compound, or a salt thereof, having the formula (I):

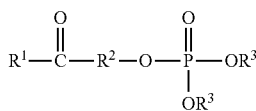 (I)

wherein, in formula (I), R¹ represents an optionally substituted vinyl group; R² represents a divalent hydrophobic group; and each R³ is independently selected from the group consisting of H and a group having the formula (II); wherein at least one R³ is present as the group of formula (II):

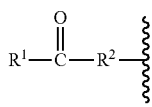 (II)

wherein, in formula (II), R¹ and R² are as defined in formula (I), and the composition has an epoxy equivalent weight less than 1.

2. The composition according to claim 1, wherein R¹, in formula (I), is selected from the group consisting of $CH_2=CH—$, $CH_2=C(CH_3)—$ and $CH(COOH)=CH—$.

3. The composition according to claim 1, wherein the fluoride ions are present in an amount such that a molar ratio of fluoride ions to iron(III) ions amounts to at least 2:1.

4. The composition according to claim 1, wherein the divalent hydrophobic group is selected from:

1) a polyoxyalkylene radical having the formula (III):

 (III)

wherein, in formula (III), R⁴ and R⁵ are independently selected from the group consisting of H and methyl; and m and n independently represent an integer from 0 to 60, wherein 1≤m+n≤60; and 2) a linear alkoxy radical having the formula (IV):

 (IV)

wherein, in formula (IV), R⁶ is a linear C2-C10 alkylene radical.

5. The composition according to claim 1, wherein the water-dispersible (meth)acrylic acid compound is selected from the group consisting of (meth)acrylic acid (ester) oligomers and (meth)acrylic acid (ester) polymeric compounds.

6. The composition according to claim 1, wherein the chain transfer agent is selected from the group consisting of: chain transfer agents used in ATRP processes; chain transfer agents used in RAFT processes; chain transfer agents used in SFRP processes; thiols; secondary alcohols; and halocarbons.

7. The composition according to claim 1, wherein the chain transfer agent is selected from the group consisting of: dithioesters, thiocarbamates, xanthates; thiols; secondary alcohols; halocarbons and combinations thereof.

8. The composition according to claim 1, wherein the chain transfer agent is selected from dodecyl mercaptan; (2,2,6,6-tetramethylpiperidin-1-yl)oxyl; tert-butyl alcohol and carbon tetrachloride.

9. The composition according to claim 1, further comprising at least one polymerization initiator.

10. The composition according to claim 1, further comprising at least one kind of particulate pigment material.

11. A method for autophoretic coating of a metal surface, wherein, at least in one step, a metal surface is contacted with the composition according to claim 1.

12. A metallic substrate comprising at least one metal surface coated according to the method of claim 11.

13. The composition according to claim 1, wherein the epoxy equivalent weight is less than 0.1.

14. The composition according to claim 1, wherein the epoxy equivalent weight is less than 0.01.

\* \* \* \* \*